United States Patent [19]

Radebaugh et al.

[11] 4,202,701
[45] May 13, 1980

[54] ASPHALT-ALUMINUM COATING COMPOSITION

[75] Inventors: Bruce A. Radebaugh, Bradley; Paul J. O'Connor; Howard J. Fischer, both of Kankakee, all of Ill.

[73] Assignee: Mortell Company, Kankakee, Ill.

[21] Appl. No.: 828,673

[22] Filed: Aug. 29, 1977

[51] Int. Cl.$^2$ .............................................. C08L 95/00
[52] U.S. Cl. .................................. 106/278; 106/280; 106/281 R
[58] Field of Search .......................... 106/280, 281, 278

[56] References Cited

U.S. PATENT DOCUMENTS

| 1,765,676 | 6/1930 | Jones | 106/277 |
|---|---|---|---|
| 1,986,591 | 1/1935 | Meyer | 106/280 |
| 2,068,966 | 1/1937 | Thurston et al. | 106/269 |
| 2,255,825 | 9/1941 | Skeen | 106/284 |
| 2,332,219 | 10/1943 | Harshberger | 106/281 R |
| 2,386,592 | 10/1945 | Canavan | 106/278 X |
| 2,461,352 | 2/1949 | Smith et al. | 106/269 |
| 2,488,252 | 11/1949 | Wood | 106/281 R X |
| 3,244,542 | 4/1966 | Brown et al. | 106/277 |
| 3,291,011 | 12/1966 | Defregger et al. | 427/137 |
| 3,549,391 | 12/1970 | Miller et al. | 106/278 |
| 3,869,297 | 3/1975 | Bellomy | 106/277 |
| 4,056,401 | 11/1977 | DeBough | 106/278 |

FOREIGN PATENT DOCUMENTS 466557 5/1937 United Kingdom ..................... 106/280

Primary Examiner—Hosea E. Taylor
Assistant Examiner—Amelia B. Yarbrough
Attorney, Agent, or Firm—Harness, Dickey & Pierce

[57] ABSTRACT

This disclosure relates to a new organic base, asbestos-free, asphalt-aluminum coating composition for use on roofs and the like. By the use of a gelling agent in place of asbestos fiber, a product with superior reflectivity is obtained which contains less aluminum than typical asbestos-containing coatings. In addition, since no water is used in the formulation of the composition, the possibility of producing such undesirable by-products as hydrogen gas or aluminum hydroxide is virtually eliminated.

1 Claim, No Drawings

ASPHALT-ALUMINUM COATING COMPOSITION

BACKGROUND OF THE INVENTION

1. Field of the Invention

The present invention pertains primarily to metallic coating compositions for use on roofs, walls and the like, and more particularly to metallic coating compositions containing asphalt and aluminum.

2. Description of the Prior Art

The state of the art is believed to be indicated by the following references:

| U.S. Pat. No. | Inventor | Issued |
| --- | --- | --- |
| 1,765,676 | Jones | June, 1930 |
| 2,068,966 | Thurston et al | January 26, 1937 |
| 2,461,352 | Smith et al | February 8, 1949 |
| 2,858,230 | Knoll et al | October 28, 1958 |
| 3,244,542 | Brown et al | April 5, 1966 |
| 3,291,011 | Defregger et al | December 13, 1966 |
| 3,869,297 | Bellomy | March 4, 1975 |

Generally, asphaltic roof coating materials have been widely used from many years as weather-proofing coatings to seal roofs and prevent the entry of water into the underlying structure. By the addition of metallic particles such as aluminum, such roof coating materials can also be made to exhibit desirable heat reflective properties and thus help maintain the underlying structure at temperatures considerably below those of the exterior ambient air.

Typical asphaltic roof coating materials are comprised of a clay base which contains clay, water and asphalt; aluminum paste, which is aluminum powder or flakes ground in oil; asbestos fiber; non-fibrous fillers, such as limestone or mica; and other additives designed to enhance mixing, adjust viscosity and/or prevent corrosion. Water is normally used in the clay base since it is readily available and economical. However, it is well-known that aluminum particles oxidize in the presence of water in a relatively short time, thus destroying the usefulness of the aluminum particles because of loss of luster, gloss, brilliance and color due to the formation of dull-surfaced aluminum hydroxide, as well as forming hydrogen gas which develops considerable pressure inside of sealed containers.

Many of the prior art attempts to solve the above problems have proven only marginally successful. For example, the aluminum particles may be coated with a corrosion preventing material, but this procedure adds substantial cost to the roof coating material. Another solution has been to mix the water and aluminum-coating components together just prior to application, so that very little opportunity is provided for reaction, however, this procedure significantly complicates the application procedure beyond that tolerable by most roofing contractors.

Most prior art formulations, which are based upon either industry or government specifications and which have attempted to solve the above problems, contain asbestos, which has recently become rather difficult to obtain due to material scarcity and costs, as well as posing possible serious health problems. In the past, it has been difficult to eliminate asbestos as a filler material and still obtain a functional product.

It is accordingly a principal object of the present invention to provide a new and improved asphalt-aluminum coating composition.

It is another object of the present invention to provide an asphalt-aluminum coating composition containing no asbestos fiber, which exhibits superior reflectivity, but which contains less aluminum than typical asbestos-containing compositions.

It is another object of the present invention to provide a coating composition containing no separate water component.

Other objects, features and advantages of the present invention will become apparent from the subsequent description, examples and the appended claims.

SUMMARY OF THE INVENTION

In accordance with the present invention, an organic based, asbestos-free, asphalt-aluminum coating composition is provided which is comprised of asphalt cut-back, aluminum paste, solid filler particles, a gelling agent, a dehydrating agent, and a petroleum base solvent. By the use of a gelling agent in place of the asbestos fiber typically used, a product with superior reflectivity may be obtained which contains considerably less aluminum than typical asbestos-containing coatings. In addition, since no water is used in the formulation of the composition, the possibility of producing hydrogen gas or aluminum hydroxide is substantially eliminated.

DESCRIPTION OF THE PREFERRED EMBODIMENTS

The asphalt-aluminum coating composition of the present invention is comprised of six major components. The first component is asphalt cut-back, which is a liquid petroleum product produced by fluxing an asphaltic base with suitable distillates. It has been found that reducing a bodied or blown asphalt in aliphatic solvent to about $65 \pm 10$ percent solids produces a suitable cut-back, with parrafinic, naphthenic or aromatic asphalts all being satisfactory for such reduction. About 50–65 percent by weight of this component appears to provide a satisfactory product.

The second component is aluminum paste which typically contains about 65 percent metal solids. Federal Specification TT-P-320C, Type II, Class 3 pigment has been found to perform well, but either coarser or finer pigments may be used with the same percentage reductions.

The third component is solid filler particles which function to give body to the coating composition. Perlite, which is volcanic glass, has been found to present satisfactory performance characteristics, although other similar materials may be substituted.

The fourth component is a gelling agent which functions both as a filler and a viscosity control agent. Attapulgite or sepiolite clay have been found to perform well in place of the asbestos fibers typically used to provide this function, although other similar functioning materials are probably acceptable and are intended to come within the scope of this disclosure.

The fifth component is a dehydrating agent which functions to absorb and remove any residual water found in the formulation. As previously described in greater detail, the presence of moisture in coating compositions containing aluminum is rather deleterious. A dehydrating agent such as fine silica ($SiO_2$) has been found to function well in the formulations made under the present invention.

The sixth component is a petroleum base solvent, which is utilized primarily to adjust viscosity of the final product and keep the material flowable prior to application. Mineral spirits is a typical petroleum base solvent.

Other components may be added to improve mixing, storage or performance of the coating composition of the present invention but are not necessary for a functional product. For instance, limestone may be used as a filler in addition to the gelling agent, as well as adding a surfactant such as nonylphenoxypoly(ethyleneoxy)ethanol.

In order to further illustrate the invention, the following examples are provided. It is to be understood, however, that the examples are included for illustrative purposes and are not intended to be limiting of the scope of the invention as set forth in the subjoined claims.

EXAMPLE 1

This composition represents a typical asbestos containing roof coating composition.

| Component | Percent by Weight |
|---|---|
| Asphalt Cut-back | 53.0 |
| Aluminum Paste (65% Solids) | 14.6 |
| Perlite | 6.5 |
| Dehydrating Agent | 0.1 |
| Mineral Spirits | 20.55 |
| Isostearic Acid | 0.25 |
| Asbestos Fiber | 5.0 |
| | 100.00 |

EXAMPLE 2

This formulation represents a preferred embodiment of the present invention.

| Component | Percent by Weight |
|---|---|
| Asphalt Cut-back | 57.0 |
| Aluminum Paste (65% Solids) | 10.5 |
| Perlite | 8.0 |
| Gelling Agent (Attapulgite or Sepiolite Clay) | 4.0 |
| Dehydrating Agent (SiO$_2$) | 0.1 |
| Mineral Spirits | 7.75 |
| Limestone | 12.0 |
| Surfactant (nonylphenoxypoly[ethyleneoxy]ethanol) | 0.65 |
| | 100.00 |

The formulation of Example 2 has a viscosity of about 11,200 centipoise when measured by a Brookfield RVF Viscometer, 20 RPM. Total non-volatiles (TNV) is about 69 percent.

It should be noted that the formulation of Example 2 contains no asbestos and is thus referred to as being "fiberless." In addition, the formulation of Example 2 contains only about 72 percent as much aluminum paste as that of Example 1, thus providing significant material cost savings. Although the formulations of Examples 1 and 2 pass equivalent broad performance specifications, that of Example 2 shows a dramatically improved reflectance, even with the reduced level of aluminum. In order to further reduce material cost, limestone has been incorporated into the formulation of Example 2 in place of the asbestos filler.

EXAMPLE 3

In preparing a formulation similar to that of Example 2, the following general procedure would be followed:

First Stage:
About 20 percent of the Asphalt Cut-back is mixed with the gelling agent and surfactant in a single arm, ribbon-blade mixer. Incorporating the surfactant with the gelling agent aids in dispersion and thixotropy building in such an organic system.

Second Stage:
About 50 percent of the Asphalt Cut-back is then added along with Perlite, the dehydrating agent, and lastly, aluminum paste.

Third Stage:
About 10 percent of the Asphalt Cut-back is added along with the limestone filler.

Last Stage:
The final 20 percent of the Asphalt Cut-back is added and then the product is adjusted to viscosity with the mineral spirits.

The resulting fiberless product (of Example 2) provides gloss characteristics equivalent or superior to those of the asbestos-containing formulation of Example 1.

A coating composition produced in accordance with the present invention should provide excellent sealing and reflective properties, as well as possessing good weather resistance and long-term durability. As mentioned previously, an additional advantage of the present invention is that no water is used in the formulation of the coating composition, thus substantially eliminating the possibility of producing such undesirable by-products as hydrogen gas or aluminum hydroxide.

By far, the most significant advantage of the present invention is that no asbestos is used, thus avoiding all the problems associated therewith, such as material scarcity and health problems. Since less aluminum is used in the coating composition of the present invention than in the asbestos-containing compositions of the prior art, substantial material cost savings may be realized. The superior reflectivity of the asbestos-free coating composition of the present invention represents another advantage.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. An asphalt-aluminum coating material comprised of:
   about 57 percent by weight of an asphaltic base selected from the group consisting of parrafinic, naphthenic, or aromatic asphalts, said base being reduced to about 65 percent solids in aliphatic solvent,
   about 10.5 percent by weight of an aluminum paste containing about 65 percent metal solids, which is added to said coating composition to provide reflectance,
   about 20 percent by weight of solid filler particles added to said coating composition to provide body, wherein said solid filler particles comprise about 8 percent by weight perlite and about 12 percent limestone,
   about 4 percent by weight of a gelling agent comprising attapulgite or sepiolite clay,
   about 0.1 percent by weight of a dehydrating agent comprising silica which functions to absorb residual water,
   about 7.7 percent by weight of a petroleum-base solvent comprising mineral spirits which is added to adjust viscosity of said coating composition, and
   about 0.7 percent by weight of a surfactant comprising nonylphenoxypoly(ethyleneoxy)ethanol.

* * * * *